United States Patent [19]
Dessapt et al.

[11] Patent Number: 6,156,197
[45] Date of Patent: Dec. 5, 2000

[54] FLUID DISTRIBUTING-COLLECTING SYSTEM AND ITS PROCESS

[75] Inventors: Jean-Paul Dessapt, Beynes; Pascal Duchene, Vienne; Bertrand Szymkowiak, La Garenne Colombes; Gilles Ferschneider, Saint Symphorien D'Ozon; Olivier Callebert, Rueil Malmaison, all of France

[73] Assignee: Institut Francais du Péetrole, Rueil-Malmaison Cedex, France

[21] Appl. No.: 09/389,071

[22] Filed: Sep. 2, 1999

[30] Foreign Application Priority Data

Sep. 2, 1998 [FR] France .................................. 98 10998

[51] Int. Cl.⁷ .................................................. B01D 15/08
[52] U.S. Cl. ...................... 210/198.2; 210/283; 210/284; 210/285; 210/541; 210/656; 210/659
[58] Field of Search ..................................... 210/656, 659, 210/198.2, 283, 284, 285, 289, 291, 541; 96/105, 107

[56] References Cited

U.S. PATENT DOCUMENTS

| | | | |
|---|---|---|---|
| 3,214,247 | 10/1965 | Broughton | 210/284 |
| 3,268,605 | 8/1966 | Boyd, Jr. | 260/666 |
| 3,523,762 | 8/1970 | Broughton | 210/284 |
| 4,999,102 | 3/1991 | Cox et al. | 210/137 |
| 5,755,960 | 5/1998 | Callebert | 210/198.2 |
| 5,846,411 | 12/1998 | Harter | 210/198.2 |
| 5,972,214 | 10/1999 | Callebert | 210/198.2 |
| 6,015,491 | 1/2000 | Renard | 210/198.2 |
| 6,024,871 | 2/2000 | Harter | 210/198.2 |

FOREIGN PATENT DOCUMENTS

| | | | |
|---|---|---|---|
| 0074815 | 3/1983 | European Pat. Off. | 210/198.2 |
| 0 769 316 | 4/1997 | European Pat. Off. | 210/198.2 |
| 95/03867 | 2/1995 | WIPO | 210/198.2 |

Primary Examiner—Ernest G. Therkorn
Attorney, Agent, or Firm—Millen, White, Zelano & Branigan

[57] ABSTRACT

A fluid distributing-collecting system for a device for bringing fluids and solids into contact comprising several distributor plates and several panels for mixing, distributing or extracting fluids. The system comprises at least one level 1 chamber in connection with the outside of said device with at least one hose and, at least one level 2 chamber that is linked with the level 1 chamber and that comprises one or more connecting hoses of a selected length that are arranged in at least one zone. The zone is identified relative to an angle $\alpha$ relative to a radius of a plate and corresponds to a given angle sector, whereby said hose lengths, angle $\alpha$ and the angle sector are selected so that the injected fluid arrives approximately at the same time on all of the panels of the same plate. This system is used for separation of paraxylene in a simulated moving bed.

20 Claims, 5 Drawing Sheets

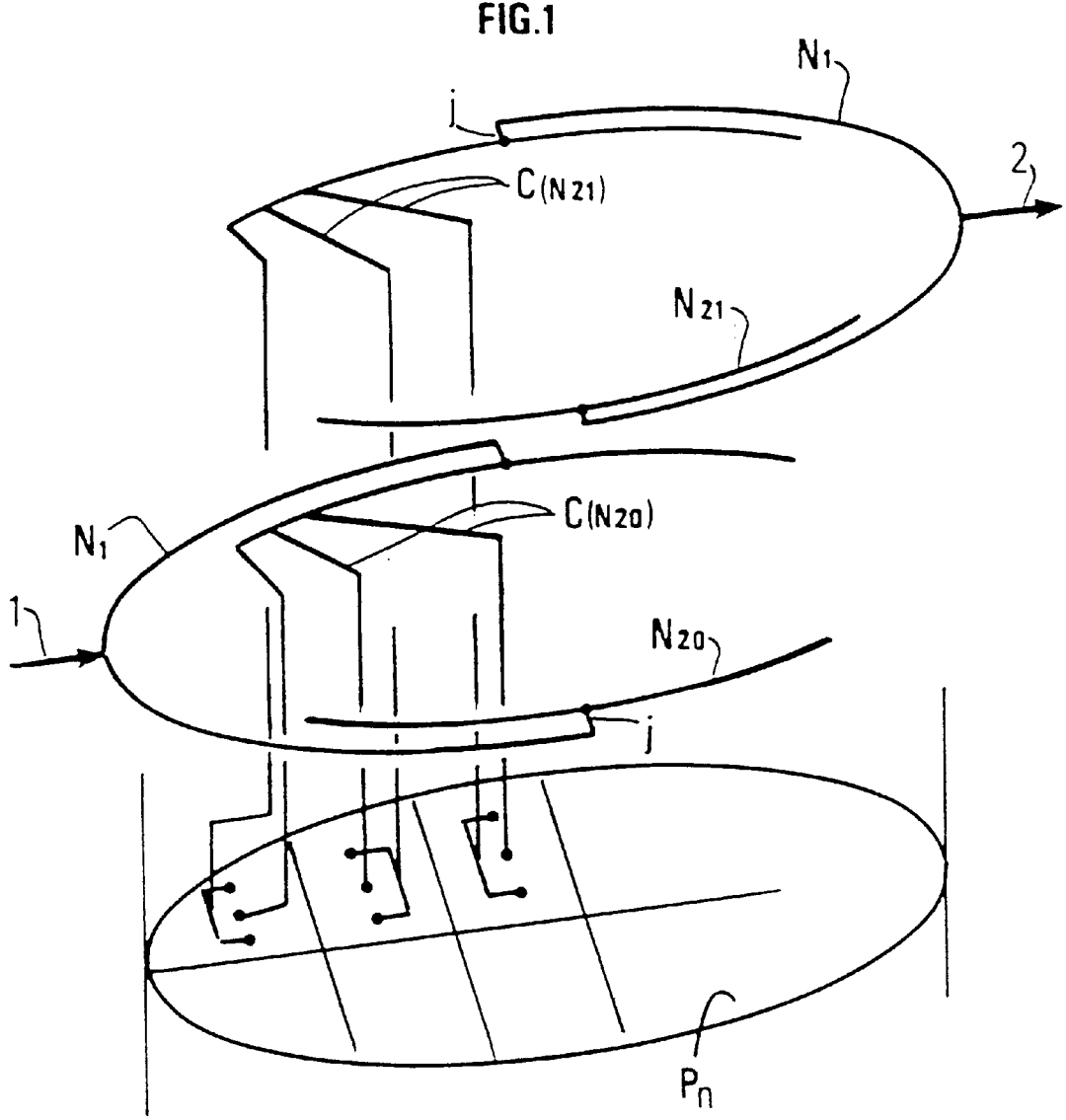

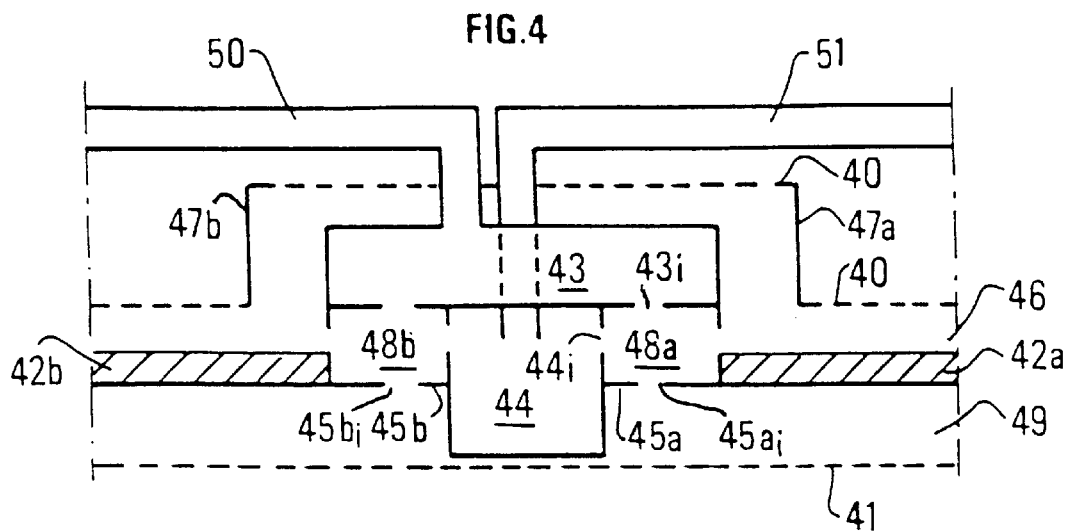
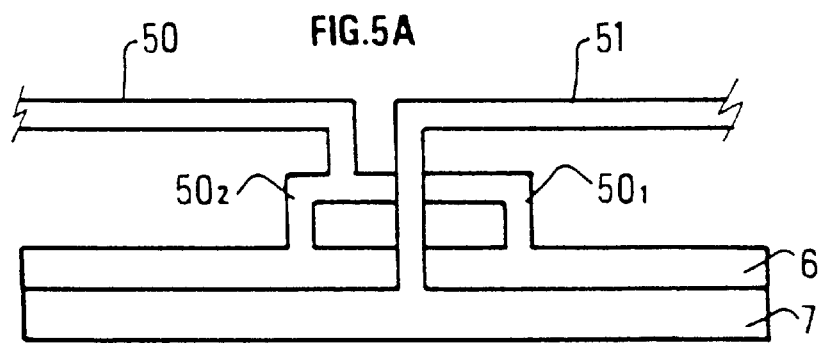
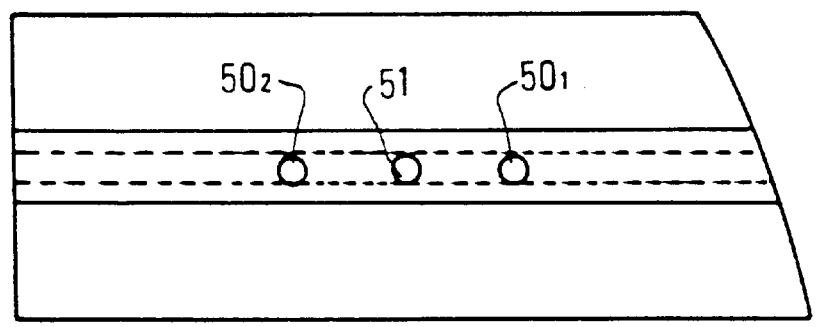

FLUID DISTRIBUTING-COLLECTING SYSTEM AND ITS PROCESS

CROSS REFERENCE TO RELATED APPLICATION

This application is related to applicants concurrently filed application U.S. Ser. No. 09/389,073, entitled "Distributor-Mixer-Extractor Of Fluids And Associated Process, based on French Application 98/10.996 filed Sep. 2, 1998.

This invention relates to a fluid distributor-collector or a fluid distributing-collecting system that is used, for example, in a device for bringing fluids and solids into contact.

The invention can be applied in particular in the area of chromatography for fluids in a gaseous state, liquid state or supercritical state.

The invention relates to a distributing-collecting system that can be used in a separation process in a simulated moving bed of paraxylene that is contained in a mixture of xylenes and ethylbenzene, for the purpose of terephthalic acid synthesis, an intermediate petrochemical product in the production of textiles.

The invention can also be used in processes for separating, for example, a xylene and ethylbenzene isomer mixture, a mixture of a compound that is selected from saturated fatty acids and their esters, a mixture of paraffin and olefins, a mixture of isoparaffins and normal paraffins, and other compounds.

The device according to the invention can operate in a liquid phase, a vapor phase or in a supercritical phase and in all of the separation areas of chemistry, petrochemistry or petroleum, for example.

In the area of separation processes, it is customary to rely on simulated moving bed systems to separate the elements that comprise, for example, at least two different chemical compounds or else two isomers of the same compound. The adsorption material that is used is, for example, a solid.

The technological background that illustrates the implementation of an adsorption device with simulated counter-current is described in, for example, U.S. Pat. No. 2,985,589.

In these processes, a main fluid that is introduced via a pump flows through the solid bed along the central axis of the column. To obtain the best performances of this process, it is important that the main fluid flows through the adsorbent according to a piston-type flow (plug flow) to have a composition and a flow front that are the most uniform possible at all points of the surface of the adsorbent bed.

For this purpose, the prior art describes various means that attempt to obtain and to maintain such a flow.

The device that is described in U.S. Pat. No. 3,523,762 that is arranged between two adsorbent beds makes it possible to remix the fluid while flowing.

For applications with simulated countercurrent, the device that is described in U.S. Pat. No. 3,214,247 shows a structure that comprises an upper grid, a lower grid for holding particles and two non-perforated horizontal baffles that are positioned between these two grids. The fluids are added or extracted from a central space between the deflectors via a hose that traverses the entire section of the device. Such a device makes it possible to remix the fluid while flowing in the column and also to ensure a good mixing of a fluid that is added to the main fluid.

It is also possible to mention the two patents U.S. Pat. No. 5,792,346 and U.S. Pat. No. 5,755,960 that describe fluid distribution panels or DME whose function in particular is to mix, extract or add fluids. These DME are connected to fluid distributing-collecting circuits that seek to homogenize the passage time of the particles of the fluid from outside of the column to the panels and conversely from a panel to an outside collecting network.

Actually, the dispersion into the composition of the flow and in the passage time of the fluid particles can also be obtained in the way in which the fluids are distributed or extracted up to the DME or from the DME.

Some distributing or collecting circuits are designed for reducing the dispersion time of the fluids. The geometry of these circuits is generally adapted to the geometry of the plates and to the arrangement of the DME at these plates.

For example, in U.S. Pat. No. 5,792,346, the circuit for distributing or extracting secondary fluids shows a distribution symmetry and an isolength of the transfer lines of the fluids. These circuits allow a distribution of the separator-type fluids or a radial distribution from or to the center of the separation column.

In U.S. Pat. No. 5,755,960, the distributing-collecting circuit consists of several radial hoses that comprise several branches for distributing or collecting secondary fluids to or from each panel that forms a distribution plate. The branches are distributed over the whole or over a portion of the length of the radial-feed hose to which they are connected. Another variant consists in distributing the fluids from a ring or half-rings that are positioned on the periphery of the column. The fluid transfer hoses up to a DME are distributed over the entire length of the ring or half-rings.

Patent EP-074,815 describes a system for distributing fluids inside a device for bringing fluids and solids into contact that comprises several fluid distributing rings. The rings are mounted on a central tube of the device and arranged between adjacent levels of fluid distributor plates. Several distribution pipes that extend between a fluid distributor plate and the distribution ring make possible the injection and/or collection of fluid.

All of these systems meet the need of obtaining a piston-type flow or "plug flow" inside of a device for bringing it into contact to minimize the passage times of fluids so that they arrive virtually at the same time in the different panels of the same plate.

The object of this invention relates to a fluid distributing-collecting system that in particular makes it possible to obtain and to maintain a plug flow, a homogeneity of the composition of this flow, and to minimize the dispersion time of the fluids that are injected or extracted in the panels that form a distribution plate.

Throughout the rest of the description, a level 1 chamber is defined as a chamber whose function is to divide a fluid at least in two or to collect two fluid flows, and a level 2 chamber is defined as a chamber that ensures the division at least in two of a fluid that is obtained from a level 1 chamber or the collection of at least two fluid flows to send them to a level 1 chamber.

The term DME refers to a panel whose function in particular is to collect, mix, extract or remix one or more fluids.

This invention relates to a fluid distributing-collecting system for a device for bringing fluids and solids into contact, whereby said device comprises a chamber, at least one hose for introducing a main fluid and at least one hose for evacuating the main fluid, several distributor plates (Pn), whereby each of said plates comprises several panels for mixing, distributing or extracting fluids or DME.

It is characterized in that it comprises:

at least one hose that makes it possible to link said device and the outside, at least one chamber ($N_1$) that is linked with said hose or hoses, one or more connecting hoses $C(N_{20})j$, $C(N_{21})j$, that link the chamber and at least one of the DME of a plate (Pn), whereby connecting points rj of said hoses are located in a zone ($Z_{20}$, $Z_{21}$), whereby the positioning of said zone is determined by an angle α counting from one of the radial axes of said plate (Pn), whereby each of the connecting hoses has a length li, whereby the value of each of lengths li, of angle α and of length Zr of the zone are selected so that the passage time of the fluids between a panel (DME) and hose or hoses (1, 2) is essentially identical for all of the fluids.

The chamber ensures, for example, the division of the fluid into at least two flows.

According to an embodiment, the distributing-collecting system comprises, for example:

at least one level 1 chamber ($N_1$) that ensures a twoway division or collection of the fluid flow, whereby chamber ($N_1$) is linked with the hose or hoses, at least one so-called level 2 chamber ($N_{20}$, $N_{21}$), whereby the chambers ensure a two-way division or collection of the fluid flow that comes from or is sent to chamber or chambers ($N_1$), one or more connecting hoses ($C(N_{20})_j$, $C(N_{21})j$ that extend between at least one level 2 chamber ($N_{20}$, $N_{21}$) and at least one of the DME of a plate (Pn), whereby connecting points rj of the hoses are located in a zone ($Z_{20}$, $Z_{21}$), whereby the positioning of the zone is determined by an angle α counting from one of the radial axes of plate (Pn), whereby each of the connecting hoses has a length li, and whereby the value of each of lengths li, angle α and length Zr of the zone are selected so that the passage time of the fluids between a panel (DME) and the hose, or hoses, is essentially identical for all of the fluids.

Angle α is, for example, between 30 and 90 degrees, preferably between 50 and 60 degrees, and length Zr for a zone that corresponds to angle sector α+/−ε is between 3 and 30 degrees and preferably between 7 and 15 degrees.

This invention also relates to a device for bringing fluids and solids into contact that comprises a chamber that comprises an outside wall, at least one hose for introducing and at least one hose for extracting a main fluid, several hoses for introducing or extracting secondary fluids, several spaced levels of plates (Pn), whereby each plate (Pn) comprises one or more distributing-mixing-extracting panels (DME) of secondary fluids and a main fluid, at least one fluid distributing-collecting system, characterized in that:

said distributing-collecting system is arranged on the periphery of the chamber, said distributing-collecting system is connected with at least one distribution plate (Pn), said system comprises:

at least one hose that makes it possible to link the device and the outside, one or more level 1 chambers ($N_1$) that ensure a two-way division or collection of the fluid flow, one or more level 2 chambers ($N_{20}$, $N_{21}$), whereby the level 2 chambers ensure a two-way division or collection of the fluid flow that comes from or is sent to level 1 chamber ($N_1$), connecting hoses ($C(N_{20})_j$, $C(N_{21})j$) that extend between a level 2 chamber ($N_{20}$, $N_{21}$) and at least one of the panels (DME) of a plate (Pn), whereby the connecting points of the connecting hoses are located in a zone ($Z_{20}$, $Z_{21}$), whereby the positioning of this zone is determined by an angle α counting from one of the radial axes of a plate (Pn), whereby each of the fluid connecting hoses has a length li, and the value of each of lengths li, angle α and length Zr of the zone are selected so that the passage time of the fluids between a panel (DME) of a plate (Pn) and the hose for introducing or extracting fluids is essentially identical for all of the fluids.

Angle α can be between 30 and 90 degrees, preferably between 50 and 60 degrees, and length Zr that corresponds to the angle sector is between 3 and 30 degrees and preferably between 7 and 15 degrees.

According to a variant embodiment, the device comprises at least one plate that comprises at least one DME that has the following characteristics:

at least one means for collecting a main fluid, at least two injection and/or draw-off rails that allow the passage of secondary fluids that are each provided with openings, whereby the rails are arranged one on top of the other, at least two mixing chambers that are provided with openings, whereby the chambers are arranged on both sides of at least one of the rails and relative to the openings, means for distributing the fluid that is obtained from the mixing chamber, means for separating said collecting and distributing means.

Each plate (Pn) can be divided into several panels or DME according to a cutaway in parallels.

A plate can be divided into four sectors.

The upper rail has, for example, a function of collecting fluids, and the lower rail has a function of injecting fluids.

The upper rail may have a function of injecting fluids, and the lower rail may have a function of collecting fluids.

According to another variant embodiment, the upper and lower rails have a fluid injecting-collecting function.

The openings of the injection rail or rails are arranged such that the fluid jet that passes through strikes at least one portion of a solid wall of one of the mechanical elements of the DME.

The openings can be arranged alternately or at random.

The openings of the injection and/or draw-off rails are defined with, for example, the following parameters:

a diameter of between 2 and 15 mm and preferably in the range of 4 to 7 mm, a perforation span of between 25 and 400 mm and preferably between 50 and 200 mm, a rate of flow of the fluids of between 3–20 m/s and preferably between 5–15 m/s; the value of the span that is under consideration with the value of the rate makes it possible to obtain a good mixing of the secondary fluid and the main fluid.

The openings of the mixing chambers have, for example, the following characteristics:

a diameter of between 10 and 25 mm, and preferably between 5 and 50 mm, a perforation span that is selected from the interval 50–200 mm and preferably in the interval of 25–400 mm, a rate of flow of the mixture of between 1.0 and 2.0 m/s and preferably between 0.5–3.5 m/s.

This invention also relates to a process for separating at least one compound from a mixture or an element by adsorption.

It is characterized in that a main fluid, from which it is sought to separate some compounds, is brought into contact with an adsorbent that is selected as a function of its ability to separate the compounds, and the secondary fluids are injected and/or extracted via one or more distributing-collecting systems.

It is possible to group the fluids by function (injection/or draw-off) or by nature or by flow rate value.

The system, device and the process according to the invention pertain to the separation of a feedstock by chromatography for fluids in a gaseous state, liquid state or supercritical state.

They can also pertain to the separation of paraxylene in a simulated moving bed.

The device according to the invention has in particular the following advantages:

because of the good distribution symmetry of the secondary fluids and the main fluid, the mixture that is produced is improved over the entire plate, which imparts a more homogenous composition and a general plug flow to the circulating flow in the separation device, to optimize the mixing of fluids inside the distribution panels, mixing, extraction, to remix the main fluid while flowing, to reduce the time dispersion of the injection of fluids or the extraction of fluids to or from various panels that constitute a distribution plate.

BRIEF DESCRIPTION OF THE DRAWINGS

Other characteristics and advantages of the device according to the invention will emerge from reading the description of examples that are given below as an illustrative and nonlimiting example by referring to the accompanying drawings, where:

FIG. 1 represents a view in perspective of a fluid distributing-collecting system example according to the invention that is associated with a distribution plate, FIG. 4 shows a diagram of a section of a special example of a distribution panel, FIGS. 5A and 5B show a top view and a section of an example of arrangement of hoses for feeding a panel.

DESCRIPTION OF THE PREFERRED EMBODIMENT

Figure 2A:
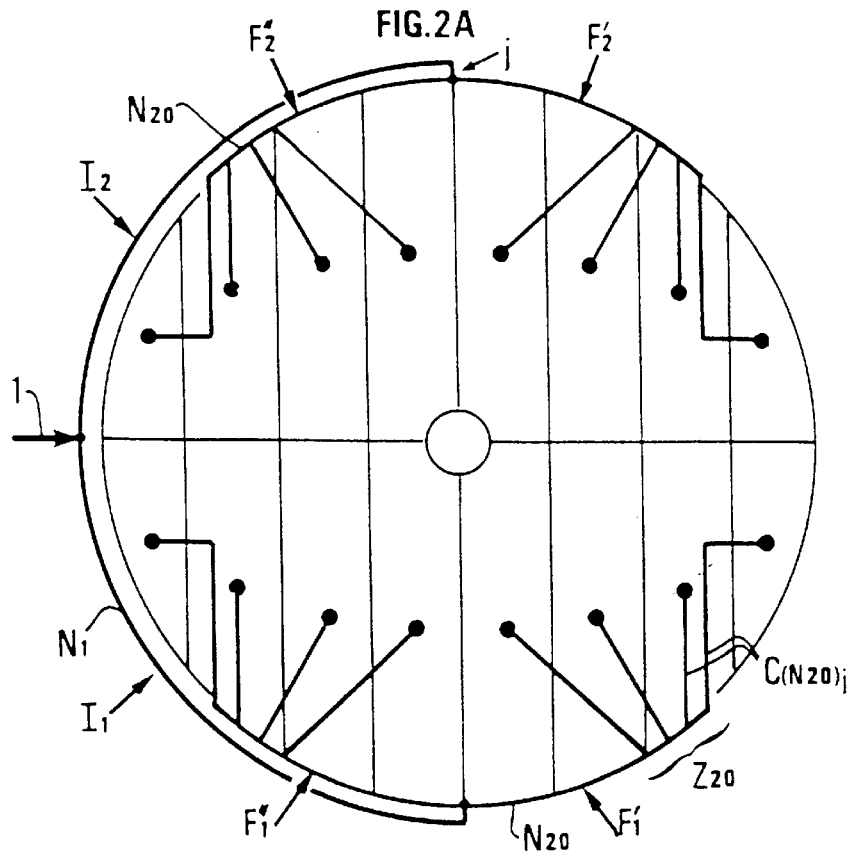
FIGS. 2A and 2B show a diagram of a section of a plate and associated distributing-collecting system.
Figure 2B:
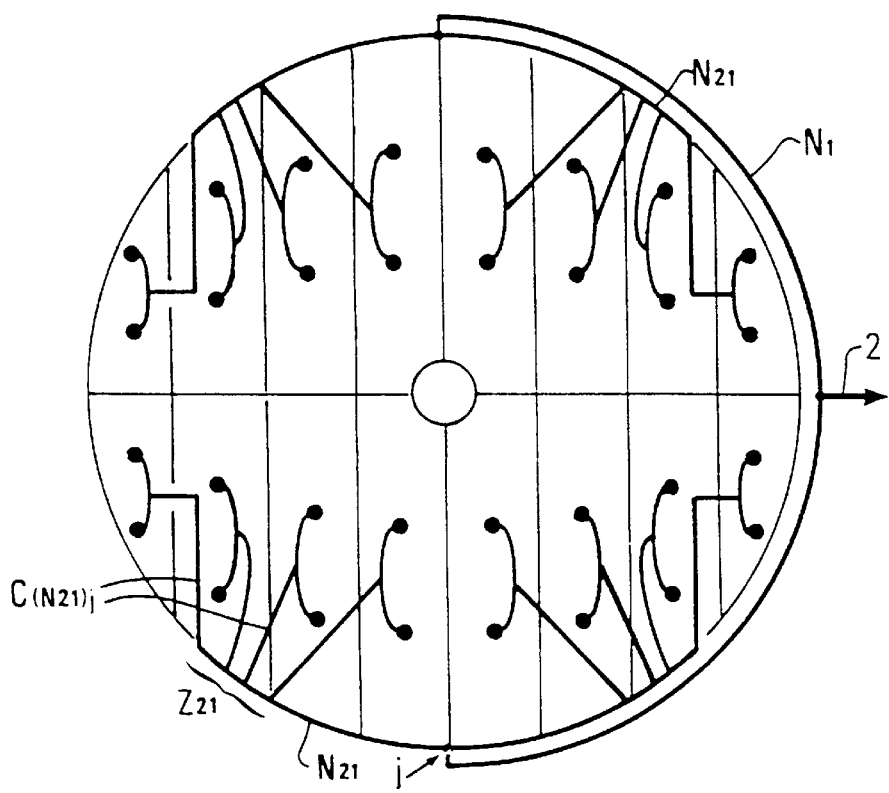

FIGS. 1 and 2A, 2B show a fluid distributing-collecting system example that is associated with a fluid distribution plate that comprises several panels or DME whose function is to mix, distribute or extract fluids.

The geometry and the hydraulic characteristics of this network are selected to obtain a distribution of secondary fluids that is the most symmetrical possible for the set of panels or injection-collection rails of a plate.

FIG. 1 showed two distributing-collecting systems that can be superposed and that are associated wtih a plate Pn. The number of distributing-collecting systems that are associated with a plate Pn is a function in particular of the geometric dimensions of the DME with which they are connected.

Figure 3:
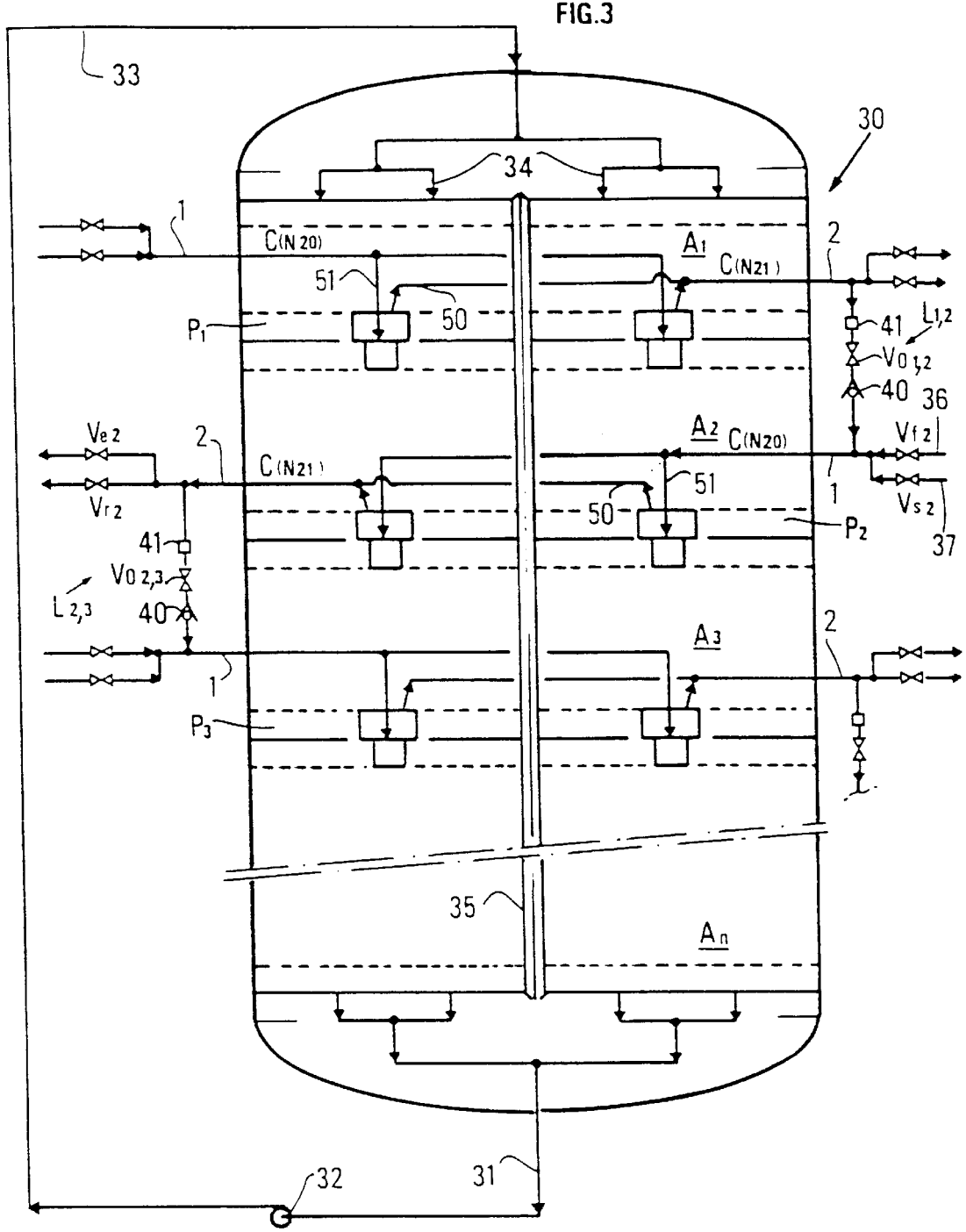
FIG. 3 shows a cutaway view of a separation column that is provided with a distributing-collecting system of FIG. 1.
Figure 6A:
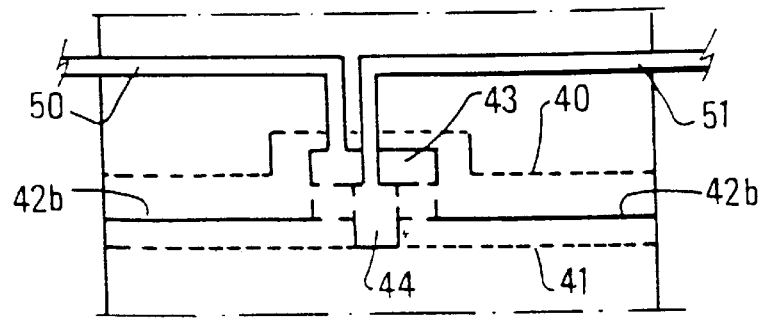
FIGS. 6A, 6B and 6C show different variant embodiments of a fluid distributing-collecting system.
Figure 6B:
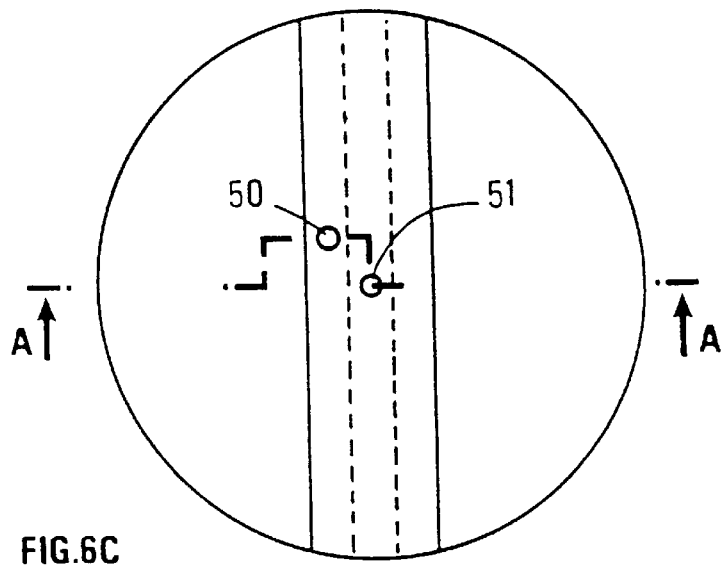
Figure 6C:
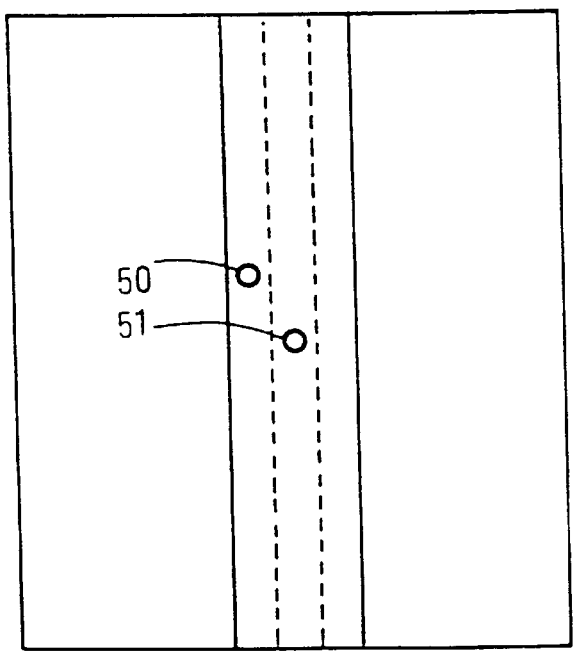

The plate is referenced Pn, whereby n is the index of the plate when it is arranged, for example, in an approximately cylindrical separation column such as the one that is described in FIG. 3. It has the shape of a disk, for example, and is cut into several DME according to a cutaway in parallels (of meridian type), whereby the widths of the different panels can be equal.

The distributing-collecting system comprises, for example:

a so-called annular level 1 chamber $N_1$. Chamber $N_1$ communicates with the outside of the column with a hose 1, 2, for example. These hoses allow the introduction and/or the extraction of fluids. They can have specific functions, for example in the case where the different fluids are grouped according to different variants of which some are described below.

Annular rectangular-section chamber $N_1$, for example, extends on the internal periphery of the adsorbent bed and ensures in particular a two-way division or collection of the circulating flow of the fluids, a so-called annular level 2 chamber $N_2$ with a rectangular section on the periphery of the adsorbent.

In particular according to its function (injection, extraction or injection/draw-off), it ensures respectively a division or a collection or else a two-way division and/or collection of the fluid flow. Its position according to the function of the distributing-collecting system, due to the geometric space requirement, for example, can be arranged above (referenced $N_2$,) or below (referenced $N_{20}$) chamber $N_1$.

Junction J of a level 2 chamber $N_{20}$, $N_{21}$ with level 1 chamber $N_1$ is produced, for example, with half of the periphery of its length.

An annular level 2 chamber comprises, for example, at each of its ends, one or more hoses $C(N_{20})j$ or $C(N_{21})j$ for connection with the panels of a plate; index j corresponds to the index of a panel that is linked with the hoses. A hose $C(N_{20})j$ or $C(N_{21})j$ is connected to a zone $(Z_{201}\ Z_{21})$ of the annular chamber ($N_{21}$ or $N_{21}$) that is concerned.

The length of a so-called annular level 1 chamber or $N_1$ is, for example, equal to half of the perimeter of the corresponding plate.

The length of a so-called annular level 2 chamber or $N_2$ is in an angular sector of 20 to 160 degrees and preferably between 100 and 120 degrees.

Zone $Z_{20}$, $Z_{21}$ can be identified by an angle $\alpha$ counting from a radius of the plate, for example the radius that passes through junction point J and relative to the central point of the zone. Its length Zr is determined by, for example, the angular sector that is defined by $\alpha+/-\epsilon$, bounded by angles $\alpha$min and $\alpha$max.

The value of angle $\alpha$ will be in, for example, the range (10 degrees, 80 degrees) and preferably in the range (40 degrees, 70 degrees).

The angular sector value will be selected in the interval (3 degrees, 30 degrees) and preferably in the interval (7 degrees, 15 degrees), which corresponds to length Zr for zones $Z_{20}$ and $Z_{21}$.

An effort is made to ensure as star-shaped an arrangement of hoses as possible to obtain the smallest dispersion time possible in the distribution or extraction of the fluids. The connecting points of the hoses are grouped, for example, virtually at the same point of the zone in the smallest possible angular sector.

The positioning of the connecting hoses, and the selection of the angular sector make it possible in particular to reduce the pure delay time and dispersion time. This delay time can thus be reduced to 10 s.

Each hose $C(N_{20})j$, $C(N_{21})j$ for distribution and/or extraction has a diameter dj, a length lj and a connecting point rj with a level 2 chamber that is located, for example, in corresponding zone $Z_{20}$, $Z_{21}$.

Different parameters, $\alpha$, $\epsilon$ and li, are selected so that the fluids arrive at approximately the same time in all of the panels that form a plate or during extraction of fluids reach hoses 1, 2 at approximately the same time.

Diameter dj of a hose is determined based on the flow rate of the fluid that circulates to ensure a fluid circulation rate that is approximately identical in the various hoses.

A connecting hose can be connected with one or more DME panels. In this case, it is extended by branches up to a rail for distributing or collecting the panel.

FIGS. 2A and 2B show a plate that comprises several DME, whereby the plate is divided into four sectors according to a cutaway in parallels (of meridian type). The number of panels in this case will preferably be an even number.

FIG. 2A shows an example where the distributing-collecting system that ensures the injection of a fluid in lower rail 44 (FIG. 4) is used, whereas FIG. 2B shows the distributing-collecting system that ensures the draw-off from upper rail 43 (FIG. 4) in the case of a DME that has one of the characteristics that are given in FIG. 4 and when the fluids are grouped by function. This example is detailed in the paragraph "case of fluids that are grouped by function" that is described below.

According to this particular embodiment, connecting hoses $C(N_{21})j$ or $C(N_{20})j$ make it possible to link an annular chamber $N_{21}$, $N_{20}$ with a panel or DME.

The example that is given above mentions an annular form for the distributing-collecting system chambers. Without exceeding the scope of the invention, it is possible to design chambers $N_1$, $N_{20}$, and $N_{21}$ that have other shapes that are adapted to the shape of the separation column on which the system is arranged.

To better understand the distributing-collecting system according to the invention, and the advantages that it provides, FIG. 3 shows a diagram of a separation column that is equipped with such a distributing-collecting system as an illustrative and nonlimiting example.

The column is, for example, a column for separation by chromatography in a simulated moving bed. The fluids that are referred to as "secondary fluids" can be the feedstock, the extract or the raffinate that are obtained by separation or else the desorbent that is used for extracting from adsorbent beds the components that have been adsorbed during the separation process.

The column comprises a chamber 30 that is, for example, essentially cylindrical and that includes all of the elements that make it possible to carry out a separation by adsorption. It is also possible to use several columns that are connected to one another.

It is filled with an adsorbent material that has a selectivity that is selected relative to the feedstock that is treated. The adsorbent material is distributed to the inside of the column in several adsorbent beds $A_1$ to $A_n$ of adsorbent. Two successive beds are separated, for example, by a fluid distributor plate Pn. Each distributor plate comprises several panels or DME and is connected to a fluid distribution system as described in FIGS. 1 and 2.

The main fluid is drawn off from the lower end of the column via a line 31 to be recycled via a pump 32 and a line 33 at the upper end of this column where it is introduced into upper adsorbent bed $A_1$ via lines 34.

In this embodiment, the column also comprises a bypass line Li,j between the plates, whose operating principle is given in Patent Application FR 97/16,273, whose teaching is incorporated with reference. Such a process makes it possible in particular to increase the purity of the products that are obtained by such a process.

For the separation of paraxylene from a xylene feedstock, for example, two columns of twelve beds each are used, whereby the twenty-four beds are divided into at least four zones, whereby each zone is delimited by an injection of a fluid from the outside of the column (of the desorbent or the feedstock, for example) and a draw-off of another fluid (extract or raffinate, for example). For example, five beds are reserved for zone 1, nine beds for zone II, seven beds for zone III and finally three beds for zone IV.

The panels of a plate Pn are linked with, for example, the outside of the column via secondary fluid transfer lines (feedstock injection line 36, desorbent injection line 37, draw-off line 38 of an extract and draw-off line 39 of a raffinate, and optionally an injection line of a fifth back flush fluid). The back flush lines are not shown in the figure for reasons of simplification.

Each of these lines is equipped with a sequential valve that is shown symbolically by Vfi, Vei, Vsi and Vri, where index i corresponds to plate Pi and where f refers to the feedstock, e the extract, s the desorbent and r the raffinate. The set of these valves is connected to means for sequential swapping-out that are suited for periodically advancing each injection point of secondary fluid or draw-off of secondary fluid from a bed in the direction of circulation of the main fluid, i.e., from top to bottom to obtain an operation in a simulated moving bed.

The circuit that makes it possible to carry out the by-pass and to obtain a composition of a fluid that is essentially identical at all points of a plate comprises a bypass line Li,j that connects two introduction or draw-off hoses, and two plates. According to the prior art, a bypass line comprises at least one of the devices that are mentioned below, by itself or in combination, namely a nonreturn valve 40, a flowmeter 41, a control valve VOi,j that may or may not be slaved to the flowmeter. A pump that is optionally arranged on the bypass line optionally does not ensure an adequate pressure drop.

The valve that equips the bypass or bypass line is referenced VOi,j where index 0 corresponds to the bypass function and indices i, j correspond to the plates between which the bypass is carried out.

More generally, a simulated moving bed comprises at least four chromatographic zones, advantageously four or five, whereby each of these zones consists of at least one column or column section. The set of these columns or column sections forms a closed loop, whereby the recycling pump between two sections is regulated in flow rate.

These different lines can be connected with a distributing-collecting system provided above.

Without exceeding the scope of the invention, any network for distribution or extraction of secondary fluids that are commonly used for the separation columns by adsorption can be used.

The chamber can comprise a central beam 35 that is aligned essentially along the vertical axis of the chamber, more particularly for columns of large diameter.

In some application cases, for example for vapor phase fluids, the chamber can be arranged approximately horizontally.

A distribution plate Pn can be cut into several panels or DME according to a cutaway in parallels (of meridian type). Each of the panels comprises characteristics such as those that are described below.

Plate Pn that is shown in a diagram in FIGS. 2A and 2B is divided into four sectors, for example according to a cutaway in parallels (of meridian type) and comprises several DME panels, preferably an even number per sector.

The cutaway of panels in parallel with an approximately equal width ensures a surface density with essentially constant drainage for the panels.

FIG. 4 presents in detail an embodiment of a panel or DME that forms the plate.

An elementary panel or DME is divided, for example, into two approximately equal surfaces by a distributing-collecting circuit that is formed by the superposition of two rectangular-section boxes or rails.

A panel comprises an upper grid 40 and a lower grid 41 by taking into consideration the direction of circulation of the main fluid inside the separation column. Upper grid 40 makes it possible to collect the main fluid, whereas lower grid 41 makes it possible to redistribute the mixture that is obtained from the mixing chamber over the entire panel.

Between these two grids, for example of slot type, are arranged various elements:

two deflectors 42a, 42b, or baffles whose function in particular is to separate the collecting channel and the distributing channel that are described below, two rails 43, 44 that allow the passage of secondary fluids; these rails are arranged one above the other, for example. Upper rail 43 can be located above the deflectors, whereas lower circuit 44 can be positioned between two deflectors 42a, 42b, and its height can be such that it extends below the deflectors.

These circuits or rails 43 and 44 are provided on at least one of their walls with one or more orifices that are referenced respectively 43i and 44i to allow the passage of the secondary fluids. In FIG. 4, orifices 43i are arranged on the lower wall of rail 43, and orifices 44i are arranged on the lateral walls of rail 44; orifices 44 are arranged so that the flows of fluids that are injected strike the end of deflectors 42a, 42b, for example.

Each rail is perforated symmetrically respectively on its lower face or its lateral face for the upper rail and on these lateral faces for the lower rail. Specifications on distribution and the size of the orifices are explained below:

in the extension of deflectors 42a and 42b are arranged perforated plates, respectively 45a, 45b (openings or slots 45ai, 45bi). These plates extend up to the walls of rail 44, for example. Openings 45ai, 45b for output of the mixture to redistribution space 49 are, for example, calibrated to promote transverse mixing, a space 46 for collecting the main fluid that is delimited by upper grid 40 (for reasons of mechanical design, the variant that is represented in the figure shows a three-part grid, whereby the parts are connected to one another by walls 47a, 47b), the top of rail 43, a lateral wall of rail 43, deflectors 42a and 42b; this space makes it possible to drain the main fluid to the mixing chambers, two mixing chambers 48a, 48b are arranged on both sides of lower rail (44).

Preferably, the chambers are arranged, for example, relative to orifices 6i, 7i of rail 6 or 7 or both, whose function will be to inject one or more fluids into the mixing chambers. They will be arranged to ensure the most homogenous, uniform or symmetrical fluid injection that is possible in the entire mixing chamber, for example.

Mixing chamber 48a is delimited by, for example, a portion of the wall of rail 43, a lateral wall of rail 44, deflector 42a and perforated plate 45a. Mixing chamber 48b is delimited in the same way by a lateral wall of rail 44, a portion of the lower wall of rail 43, deflector 42b and perforated plate 45b.

The main fluid that is collected by grid 40 travels from the collecting space to mixing chamber 48a, 48b respectively in the form of a thin space via the slot that is formed between the upper rail and one of the deflectors:

A space 49 for distributing the mixture or collecting the fluid that is to be drawn off, whereby this space is delimited by lower grid 41, the lower wall of lower rail 44, when the latter is not arranged at the same level as grid 41 and mixing chambers 48a, 48b as well as two deflectors 42a, 42b.

Because of the arrangement of the orifices, mixing chambers and distributing and/or collecting rails, the mixture that is obtained in the redistribution space has a composition whose homogeneity is improved relative to the devices of the prior art.

The rails or circuits that are intended for passage of secondary fluids, as well as the two mixing chambers, have, for example, elongated rectangular shapes.

According to a variant embodiment, it is possible to arrange between the lower end of walls 47a, 47b and corresponding deflector 42a, 42b means that make it possible to create a series of calibrated orifices or slots to inject the main fluid in the form of several jets into the mixing chambers.

The distribution of different orifices 43i, 44i at rails 43, 44 and the mixing chamber is selected so that in the injection function, the fluids that are injected strike at least a portion of a solid wall of one of the elements of the DME.

For example, when rail 43 has a draw-off function and rail 44 has an injection function, the geometric and dimensional data for orifices 43i, 44i relative to the distribution rails as well as their distribution on the various walls will be selected from among, for example, the following values:

a diameter of between 2 and 15 mm and preferably in the range of 4 to 7 mm, a perforation span of between 25 and 400 mm and preferably between 50 and 200 mm, a rate of flow of the fluids of between 3–20 m/s and preferably between 5–15 m/s, whereby the rate makes it possible to feed all of the orifices in the most homogenous way possible; the value of the span that is being considered with the value of the rate makes it possible to obtain a good mixing of the secondary fluid and the main fluid.

The criteria that are given for the selection of values of the rate of flow and the perforation span are valid regardless of the shape of the orifices.

As an additional characteristic, orifices 44i have an axis that makes it possible for injected fluid to strike a portion of a solid wall of one of the mechanical elements of the DME.

The configuration and the criteria for sizing of the draw-off network are approximately identical to those of the injection network. A difference exists in the perforation plane of the draw-off rail. The diameter of the draw-off holes will be selected to obtain a span that is twice that of the injection rail and an alternate arrangement, for example at random.

Outlet openings 45ai, 45bi of a mixing chamber or orifices for passage of the mixture will have the following characteristics:

a diameter of between 5 and 50 mm, and preferably between 10 and 25 mm, a perforation span that is selected from the interval 25–400 mm and preferably in the interval 50–200 mm, a rate of flow of the mixture of between 0.5 and 3.5 m/s and preferably between 1.0–2.0 m/s.

Because of the arrangement of the rails, connecting hoses $C(N_{20})j$ are connected to injection rails 44 by a single hose 50, and connecting hoses $C(N_{21})j$ are divided at extraction rail 43 (FIG. 5A) into two hoses $51_1$, $51_2$ that are joined in a hose 51, for example.

Hoses $51_1$, $51_2$ are located on both sides of hose 50. These hoses are arranged to have an injection or extraction function that is the most symmetrical possible for rails 43, 44.

Based on the groupings of fluids, rails 43 and 44 can ensure different functions: a distribution function, an extraction function or else two functions.

According to a variant embodiment, a DME or a panel can also be divided into several injecting-collecting systems therefore to comprise several superposed rail systems. In this case, hoses 50, 51 are divided to be arranged relative to the upper and lower rails in a manner that is essentially identical to the one that is described in FIGS. 5A and 5B.

Case of grouping fluids by function:

Injection (FIGS. 1 and 2A)

Four hoses $C(N_{20})j$ with j varying from 1 to 4 make possible the injection of fluid to four DME of a quarter plate sector, the feedstock and/or the desorbent are introduced via hose 1 into annular chamber $N_1$. The injected flow is divided into two flows that travel through paths 11 and 12 and that correspond approximately to one half of the semi-circumference of the plate. Each flow then travels into annular chamber $N_{20}$, in which it is divided into two flows F'1 and F"1. Each flow is then distributed from connecting hoses $C(N_{20})j$ that are grouped in zone $Z_{20}$ and hose 50 in connection with these connecting hoses at lower rail 44 of each of the DME.

The flows that are obtained from orifices 44i will strike the end of deflectors 42a, 42b and are mixed with the main fluid space.

Extraction (FIGS. 1 and 2B)

Four hoses $C(N_{21})j$ will make it possible to extract a fluid from 4 panels or DME, the extract and the raffinate are drawn off from a rail of a panel, for example upper rail 43, and two dipping hoses $51_1$, $51_2$ to hose 51. They then pass through connecting hoses $C(N_{21})j$ in connection with zone $Z_{21}$ of a chamber $N_{21}$. The two flows of fluids that are collected in the zones that are positioned at the two ends of annular chamber $N_{21}$ are grouped before passing into annular chamber $N_1$ in connection with hose 2 that recovers all of the flows that are obtained from the four sectors of the plate.

Case of grouping fluids by nature:

The fluids that are being considered as characteristic fluids are the desorbent and the extract and the so-called "dirty" fluids, the raffinate and the feedstock.

In this case, rails 43 and 44 ensure the two distribution and extraction functions.

Case of grouping by flow rate:

The fluids that have, for example, a low flow rate will be the feedstock and the extract, and the fluids that have a high flow rate will be the desorbent and the raffinate.

In this case, rails 43 and 44 ensure the two distribution and extraction functions.

In the two latter grouping examples, the fluids that are injected via openings 43i and 44i will strike a portion of the solid walls respectively of wall 45 and deflectors 42A, 42B. They pass through the distributing-collecting system in connection with the panel; whereas the fluids that are to be extracted are collected in rails 43 or 44 before being sent via connecting hoses to the annular chambers that are mentioned above.

The orifices or passage of fluids can have any type of geometry, such as a single slot, several slots or else holes.

The injection and extraction paths are identical to those that have been described in the grouping diagram by function.

The space for collecting the main fluid preferably has a shape that is suited for minimizing the dead volumes and the turbulence of the fluids. It has a height of, for example, between 3 and 25 mm and preferably between 7 and 15 mm, and an approximately rectangular or conical shape. It may have the characteristics that are mentioned in abovementioned U.S. Pat. No. 5,755,960 of the applicant.

The distribution space of the mixture before the grid will be determined, for example, by taking into consideration the physical characteristics of the main fluid.

The volume of the mixing chamber preferably will be adapted for minimizing the dead volumes. Its dimensions can be selected from among those that are given in one of U.S. Pat. No. 5,792,346 and U.S. Pat. No. 5,755,960.

Any means for promoting turbulence can be added to the inside of the mixing chamber. These means can be presented in the form of obstacles, baffles or any other means that are intended to increase the effectiveness of the mixture. The volume of this chamber will be selected in a small enough size to minimize the influence of retromixing phenomena.

The given parameters for a DME and for the distributing-collecting system above by way of example in relation with a separation column of an approximately cylindrical shape can be applied, without exceeding the scope of the invention, to a separation column that has any shape whatsoever, whereby the distributing-collecting system then has a shape that is suited to that of the column.

Likewise, a plate can be divided into several DEM according to a cutaway other than the cutaway in parallels, for example into sectors of pie chart type.

Without exceeding the scope of the invention, the DME and the distributing-collecting system that are described above can easily be used in separation devices that may or may not comprise a central holding beam and that have a diameter that varies, for example, from 3 to 10 m.

They can also be used for separation columns that have a diameter that is less than or equal to 5 m and that do not comprise a central support beam.

In the preceding description, the terms "rail" and "circuit" are used interchangeably. Other possible synonyms go are "channel" and "trough".

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 98/10.998, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Fluid distributing-collecting system for a device for bringing fluids and solids into contact, whereby said device comprises a chamber (30), at least one hose (33) for introducing a main fluid and at least one hose (31) for evacuating the main fluid, several distributor plates (Pn), whereby each of said plates comprises several panels for mixing, distributing or extracting fluids or DME, characterized in that it comprises:

at least one hose (1, 2) that makes it possible to link said device and the outside, at least one chamber ($N_1$) that is connected with said hose or hoses (1, 2), one or more connecting hoses $C(N_{20})j$, $C(N_{21})j$, that link the chamber and at least one of the DME of a plate (Pn), whereby connecting points rj of said hoses are located in a zone ($Z_{20}$, $Z_{21}$), whereby the positioning of said zone is determined by an angle α counting from one of the radial axes of said plate (Pn), whereby each of the connecting hoses has a length li, whereby the value of each of lengths li, of angle α and of length Zr of the zone is selected so that the passage time of the fluids between a panel (DME) and hose or hoses (1, 2) is essentially identical for all of the fluids.

2. System according to claim 1, wherein said chamber ensures the division of the fluid into at least two flows.

3. Fluid distributing-collecting system according to claim 1, wherein it comprises:

at least one level 1 chamber ($N_1$) that ensures a twoway division or collection of the fluid flow, whereby said chamber ($N_1$) is connected with hose or hoses (1, 2), at least one so-called level 2 chamber ($N_{20}$, $N_{21}$), whereby said chambers ensure a two-way division or collection of the fluid flow that comes from or is sent to chamber or chambers ($N_1$)I one or more connecting hoses $(C(N_{20})_j$, $C(N_{21})j$ that extend between at least one level 2 chamber ($N_{20}$, $N_{21}$) and at least one of the DME of a plate (Pn), whereby connecting points rj of said hoses are located in a zone ($Z_{20}$, $Z_{21}$), whereby the positioning of said zone is determined by an angle α counting from one of the radial axes of said plate (Pn), whereby each of the connecting hoses has a length li, and whereby the value of each of lengths li, angle α and length Zr of the zone are selected so that the passage time of the fluids between a panel (DME) and hose or hoses (1, 2) is essentially identical for all of the fluids.

4. Distributing-collecting system according to claim 1, wherein angle α is between 30 and 90 degrees, and length Zr for a zone that corresponds to angle sector α+/−ε is between 3 and 30 degrees.

5. The distributing-collecting system according to claim 4, wherein the length Zr for a zone that corresponds to angle α+/−e is between 7 and 15 degrees.

6. Device for bringing fluids and solids into contact that comprises a chamber (30) that comprises an outside wall, at least one hose (33) for introducing a main fluid and at least one hose (31) for extracting a main fluid, several hoses for introducing or extracting secondary fluids, several spaced levels of plates (Pn), whereby each plate (Pn) comprises one or more distributor-mixer-extractor (DME) panels of secondary fluids and the main fluid, at least one distributing-collecting system of said fluids, wherein:

said distributing-collecting system is arranged on the periphery of said chamber, said distributing-collecting system is connected with at least one distribution plate (Pn), said system comprises:

at least one hose (1, 2) that makes it possible to link the device and the outside, one or more level 1 chambers ($N_1$) that ensure a two-way division or collection of the fluid flow, one or more level 2 chambers ($N_{20}$, $N_{21}$), whereby said level 2 chambers ensure a two-way division or collection of the fluid flow that comes from or is sent to level 1 chamber ($N_1$), one or more connecting hoses $(C(N_{20})_j$, $C(N_{21})j)$ that extend between a level 2 chamber ($N_{20}$, $N_{21}$) and at least one of the panels (DME) of a plate (Pn), whereby the connecting points of said connecting hoses are located in a zone ($Z_{20}$, $Z_{21}$), whereby the positioning of this zone is determined by an angle α counting from one of the radial axes of a plate (Pn), whereby each of the fluid connecting hoses has a length li, the value of each of lengths li, angle α and length Zr of the zone are selected so that the passage time of the fluids between a panel (DME) of a plate (Pn) and hose (1, 2) for introducing or extracting fluids is essentially identical for all of the fluids.

7. Device according to claim 6, wherein angle α is between 30 and 90 degrees, and wherein length Zr that corresponds to the angle sector is between 3 and 30 degrees.

8. The device according to claim 7, wherein the angle sector is between 7 and 15 degrees.

9. Device according to claim 6, wherein each plate (Pn) is divided into several panels or DME.

10. Device according to claim 9, wherein a plate is divided into four sections.

11. Device for bringing it into contact according to claim 6, wherein it comprises at least one plate that comprises at least one DME that has the following characteristics:

at least one means for collecting a main fluid (40), at least two rails (43, 44) that allow the passage of secondary fluids that are each provided with openings (43i, 44i), whereby said rails are arranged one on top of the other, at least two mixing chambers (48a, 48b) that are provided with openings (45ai, 45bi), whereby said chambers are arranged on both sides of at least one of said rails (43, 44) and relative to openings (43i, 44i) to obtain a homogeneous distribution or collection of the fluid, means for distributing (41, 49) the fluid that is obtained from the mixing chamber, means for separating said collecting and distributing means (42a, 42b).

12. Device according to claim 7, wherein said upper rail (43) has a fluid collecting function, and said lower rail (44) has a fluid injecting function.

13. Device according to claim 6, wherein said upper rail (43) is adapted to have a fluid injecting function, and said lower rail (44) is adapted to have a fluid collecting function.

14. Device according to claim 6, wherein said upper rail (43) and lower rail (44) are adapted to have a fluid injecting-collecting function.

15. Device according to claim 6, wherein the openings of rail or rails (43i, 44i) that are adapted to have an injecting function are arranged such that the fluid jet that passes through strikes a portion of a solid wall of one of the mechanical elements of the DME (42a, 42b, 45a, 45b).

16. Device according to claim 6, wherein openings (43*i*, 44*i*) are arranged alternately or at random.

17. Device according to claim 6, wherein the parameter of the rails and openings (43*i*, 44*i*) is defined by:
   a diameter of between 2 and 15 mm,
   a perforation span of between 25 and 400 mm,
   a rate of flow of the fluids of between 3–20 m/s, whereby the value of the span that is being considered with the value of the rate makes it possible to obtain a good mixing of the secondary fluid and the main fluid.

18. The device according to claim 17, wherein rate of flow of the fluids is between 5 and 15 m/s;
   wherein the perforation span interval is between 50 and 200 mm; and
   wherein the rate of flow of the fluids is between 5–15 m/s.

19. Device according to claim 5, wherein openings (45*ai*, 45*bi*) of mixing chambers (48*a*, 48*b*) are selected from among the following parameters:
   a diameter of between 10 and 25 mm,
   a perforation span that is selected from the interval 50–200,
   a rate of flow of the mixture of between 1.0 and 2.0 m/s.

20. The device according to claim 19, wherein the diameter is between 5 and 50 mm;
   the perforation span interval is between 25–400 mm; and
   wherein the rate of flow of the fluids is between 0.5–3.5 ms.

* * * * *